Nov. 4, 1952   H. DE BREY   2,616,249
HOT-GAS RECIPROCATING ENGINE OF THE KIND
COMPRISING ONE OR MORE CLOSED CYCLES
Filed April 11, 1950
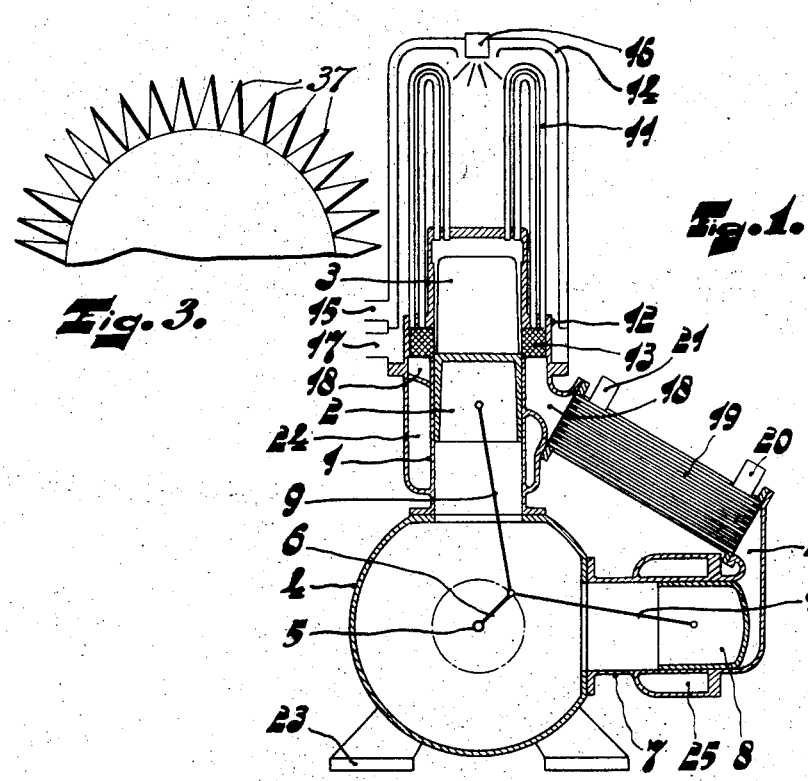
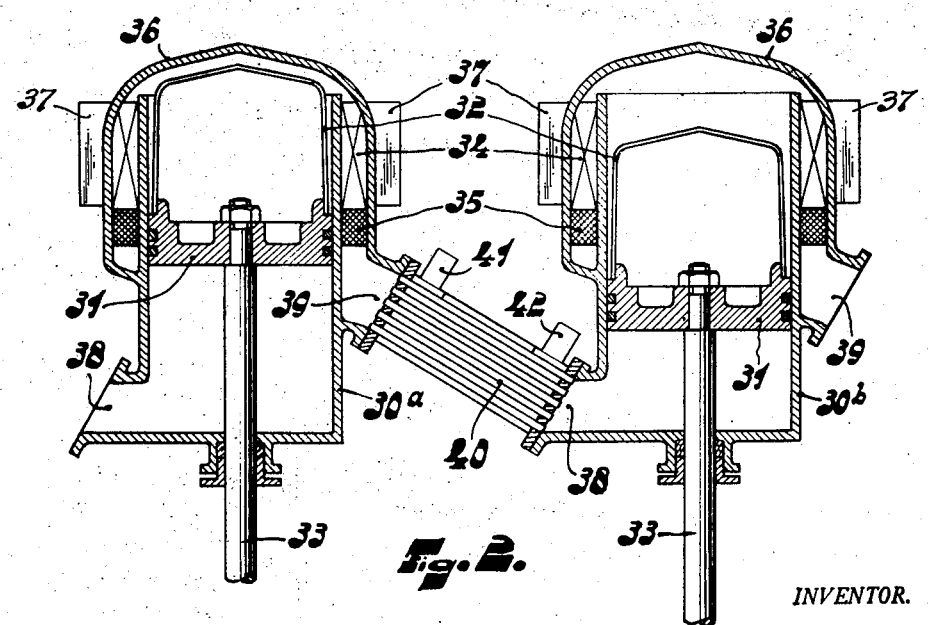
*INVENTOR.*
HEINRICH DE BREY
BY
AGENT Patented Nov. 4, 1952

2,616,249

UNITED STATES PATENT OFFICE 2,616,249

HOT-GAS RECIPROCATING ENGINE OF THE KIND COMPRISING ONE OR MORE CLOSED CYCLES

Heinrich de Brey, Eindhoven, Netherlands, assignor to Hartford National Bank and Trust Company, Hartford, Conn., as trustee Application April 11, 1950, Serial No. 155,334
In the Netherlands April 14, 1949

4 Claims. (Cl. 60—24)

This invention relates to hot-gas reciprocating apparatus. More specifically, this invention relates to the arrangement and structure of the cooler and/or the heater of such an apparatus.

It is known to use hot-gas reciprocating apparatus, such as engines, heat pumps or refrigerators operating on the reversed hot-gas engine principle having one or more closed cycles, in which the hot space and the cold space, associated with one cycle of operations, are located in various cylinders. Such apparatus may be designed so that a piston surface in a given cylinder determines the volume of the hot space, whereas a piston surface in another cylinder determines the volume of the cold space associated with the same cycle as the said hot space.

It has been suggested to house the elements required for the operation of the apparatus, (i. e. the heater, regenerator and cooler) in the channel, connecting the two cylinders, but this arrangement has limitations. Firstly, the clearance space is large, since the two channels providing communication between the cylinder and the heater or the cooler respectively form a clearance space. It is true that the channel itself is thus done away with as a clearance space between the two cylinders, but the volume of this channel will generally not outweigh the additional clearance space involved by the said arrangement. Furthermore, the connection of the channel to the cooler presents difficulties from the point of view of fluid flow technique.

According to the invention, a hot-gas reciprocating apparatus, such as an engine, a heat pump or a refrigerator operating on the reversed hot-gas engine principle with one or more closed cycles of operations, in which the hot space and the cold space associated with one cycle of operations are located in different cylinders and which comprise a heater, a regenerator and a cooler, are characterized in that the heater and the regenerator are arranged to be concentric with the axis of the cylinder comprising the hot space, while the junction between this cylinder and the cylinder comprising the associated cold space includes the cooler.

The invention provides several advantages. In a known arrangement of the heater, regenerator and cooler, these elements are all arranged to be concentric with the cylinder comprising the hot space. With a view to obtaining optimum thermo-dynamic efficiency it is desirable that the velocity of flow of the medium in the regenerator should be small compared with the velocity of flow of the medium in the cooler, in order that the resistance to flow in the regenerator may be kept within permissible limits. In contradistinction thereto the velocity of flow in the cooler must be high since otherwise the heat transfer between medium and cooler wall is unfavourable and the cooling surface, in order to compensate therefor, must be so large that the clearance space becomes larger than is desirable. In addition with a concentric arrangement of all the elements about the cylinder, the dimensions of the cooler are restricted to definite limits, and in the last-mentioned arrangement, it is furthermore necessary to lead the flow medium in the desired direction by providing guide members and similar expedients between the cooler and the junction duct. However, it has been found that such expedients can be designed only with difficulty for the velocities concerned. Furthermore, such arrangements present a high resistance to the flow of the medium.

According to the invention, by housing the cooler in the channel which provides communication between the hot cylinder and the cold cylinder, the clearance space is reduced as compared with that of the known arrangement. Then, there is provided greater liberty in the choice of the cooler dimensions, whilst it is possible for the cooler to be designed so that the requirements as to heat transfer and velocity of flow are satisfied in the optimum manner. Furthermore guide members and similar parts are unnecessary, since the form into which the short junction duct between regenerator and cooler is to be shaped is now determined by the much lower velocity of flow through the regenerator and can be realized in a manner which is simple from the point of view of flow technique.

In one embodiment of the invention the heater is preferably made of a group of pipes through which the medium flows. Such a heater, known per se, provides advantages from a thermodynamic point of view and is structurally simple but its use may involve difficulty, since the dimension of the cylinder with the heater and heat source with respect to the length thereof becomes great. However, if this pipe heater is used with an apparatus according to the invention, this difficulty is mitigated, due to the removal of the cooler surrounding this cylinder and consequently the length of this cylinder being smaller in this case.

In view of the ground space occupied by the engine, it is advantageous, if in accordance with a preferred embodiment of the invention the two cylinders comprising the hot space and the cold space respectively are set at an angle to one another, the axis of the cylinder comprising the hot space being vertical. The angle to be chosen depends on the phase displacement desired between the way in which the volume of the hot space and that in which the volume of the cold space varies. Also in view of a favourable arrangement of the engine an angle of 90° will generally be chosen. Since the cold cylinder may be considerably shorter than the hot cylinder, the floor space occupied by the engine is small.

In order that the invention may be more clearly understood and readily carried into effect it will now be described in detail with reference to the accompanying drawing, in which embodiments of the invention are shown by way of example.

Fig. 1 is a vertical cross-section of an engine in which the cylinders are at right angles to one another, Fig. 2 is a vertical cross section of part of a multi-cylinder engine, the cylinders of which are aligned, and Fig. 3 is a fragmentary top plan view of one of the cylinders shown in Fig. 2.

Referring to Fig. 1, a piston 2 is adapted to move in a cylinder 1 and is provided with a piston cap 3. The cylinder 1 is secured to a crank case 4, in which a shaft 5 provided with a crank 6 is adapted to move. Secured to this crank case 4 is a second cylinder 7, in which a piston 8 is adapted to move. The pistons 2 and 8 are linked to the crank 6 by connecting rods 9 and 10. On top of the cylinder 1 is provided a pipe heater 11 comprising a plurality of hair-pin-shaped pipes through which the working medium of the engine flows. The pipes are secured on the one hand to the top of the cylinder 1, and on the other hand to flange 12 secured to the cylinder. In addition, provision is made of a regenerator 13, which is arranged to surround the cylinder in a space to which the pipes of heater 11 are connected. The pipe heater 11 is enclosed by a jacket 14, through which flows combustion air supplied from a port 15. The heat energy is supplied by the burner 16, whereas the combustion gases are discharged through a port 17. At the lower side of the regenerator 13, provision is made of a space 18, which opens into a pipe cooler 19. The medium required to be cooled flows through the pipes of this pipe cooler 19 and the cooling medium is supplied and discharged through ports 20 and 21 respectively. On the other side of the cooler 19 a space 22 opens into the cylinder 7. The hot cylinder 1 is arranged vertically and the cold cylinder 7 makes an angle of 90° with the hot cylinder 1. The whole of the engine is mounted upon two support bases 23. Now the space 18 is dimensioned so that, after passing through the regenerator, in which it has a velocity of flow, of, say, 3 meters per second, the medium, when entering the cooler, has a velocity which approaches as close as possible a velocity of 20 meters per second in the cooler. The unavoidable clearance spaces 18 and 22 have a materially smaller volume than the junction duct between the hot and the cold cylinders would have if the cooler were arranged in known manner to be concentric with the cylinder. Moreover the cylinder 1 may be shortened and this enables the use of a pipe heater without the length of the hot cylinder plus the heater becoming excessive. An additional advantage is that a cooling jacket 24 may be provided to cool the running surface of the cylinder. This cooling jacket 24 may be traversed by a cooling medium which has a lower temperature than the cooling medium used to cool the cylinder wall in the concentric cooler arrangement hitherto used and which provides satisfactory cooling of this part of the cylinder. A cooling jacket of this kind is also arranged to surround the cold cylinder 7 and is designated 25.

The embodiment described has the advantage that the space 18 can be proportioned without difficulty to be such that guide members for the medium discharging from or entering the regenerator are not required between the regenerator and the cooler to so provide a structural simplicity. By shaping the space 18 into a suitable form, it may be ensured that the velocity of the medium in the annular channel becomes substantially equal to the velocity of flow through the regenerator. Additionally, the form on the cooler side may be such that the velocity of the medium is altered to conform as far as possible with the velocity of flow through the cooler.

Referring to Fig. 2, 30a and 30b designate two identical cylinders which form part of a multi-cylinder engine, the cylinders of which are aligned. Adapted to move in these cylinders are pistons 31 which are provided with piston caps 32 and have secured to them piston rods 33. The cylinders are surrounded by the fins of a heater 34 and by regenerators 35. A heater jacket 36 is provided with a plurality of external fins 37 as shown in Fig. 3. The cylinders are furthermore provided with inlet apertures 38. The space in which the heater 34 and the regenerator 35 are arranged communicates through a channel 39 with a cooler 40, which in turn communicates with the port 38 of the second cylinder. This channel 39 is shaped into a form such that after passing through the regenerator 35 at a low rate, the medium when entering the cooler 40 has a velocity which approximates as far as possible the velocity in the cooler. This cooler 40, which is provided with entry and exit ports 41 and 42, respectively for the cooling medium, provides communication between the hot space of one cylinder and the cold space of an adjacent cylinder. The volume of the medium in a single cycle of operations is determined by the upper surface of the piston 31 in the cylinder 30a and the lower surface of this piston in cylinder 30b, between which surfaces there is a given phase shift in movement. In this embodiment also, the clearance spaces have a smaller volume than would be the case if the cooler were arranged in known manner so as to be concentric with the cylinder. The cylinder cooling space 24 of Fig. 1 may be used with the cylinders shown in Fig. 2.

What I claim is:

1. A hot gas reciprocating engine comprising first and second cylinders, said first cylinder enclosing a hot space, said second cylinder enclosing a cold space, means connecting said hot and cold spaces, said means comprising a heater arranged around the hot space of said first cylinder, a regenerator in communication with said heater and arranged around said first cylinder, and a cooler communicating with said regenerator and said cold space, said cooler being arranged between said two cylinders.

2. A hot gas reciprocating engine comprising first and second cylinders, said first cylinder enclosing a hot space, said second cylinder enclosing a cold space, means connecting said hot and cold spaces, said means comprising a heater arranged around the hot space of said first cylinder, a regenerator in communication with said heater and arranged around said first cylinder, and a cooler communicating with said regenerator and said cold space, said cooler being arranged in a conduit extending between said two cylinders, each cylinder also being partially enclosed by another cooler for cooling the running surfaces thereof.

3. A hot gas reciprocating engine comprising a first cylinder and a second cylinder at right angles thereto, a piston in each cylinder secured to connecting rods mounted on a common crank of a crankshaft, said first cylinder enclosing a hot space, said second cylinder enclosing a cold space, means connecting said hot and cold spaces, said means comprising a heater arranged around the hot space of said first cylinder, a regenerator in communication with said heater and arranged around said first cylinder, and a cooler communicating with said regenerator and said cold space, said cooler being arranged between said two cylinders.

4. A hot gas reciprocating engine comprising a plurality of cylinders, each cylinder enclosing a hot and a cold space, a piston in each cylinder separating the hot and cold spaces, means connecting the hot space of each cylinder to the cold space of one of the other cylinders, said means comprising a heater arranged around the hot space of one cylinder, a regenerator arranged around the same cylinder and adjoining said heater, and a cooler communicating with this regenerator and a cold space of another cylinder, said cooler being arranged between the two cylinders so connected.

HEINRICH DE BREY.

REFERENCES CITED

The following references are of record in the file of this patent:

UNITED STATES PATENTS

| Number | Name | Date |
|---|---|---|
| 155,087 | Hirsch | Sept. 15, 1874 |
| 228,716 | Woodbury et al. | June 8, 1880 |
| 1,306,865 | Stoddard | June 17, 1919 |
| 2,484,392 | van Heeckeren | Oct. 11, 1949 |
| 2,486,081 | van Weenen | Oct. 25, 1949 |

FOREIGN PATENTS

| Number | Country | Date |
|---|---|---|
| 34,493 | Germany | Jan. 27, 1886 |
| 150,172 | Germany | Nov. 23, 1901 |